(12) United States Patent
Yang et al.

(10) Patent No.: US 7,986,385 B2
(45) Date of Patent: Jul. 26, 2011

(54) LCD PANEL

(75) Inventors: Tun-Chun Yang, Taipei (TW); Seok-Lyul Lee, Hsinchu (TW)

(73) Assignee: Au Optronics Corporation, Hsin-Chu (TW)

( * ) Notice: Subject to any disclaimer, the term of this patent is extended or adjusted under 35 U.S.C. 154(b) by 389 days.

(21) Appl. No.: 12/103,807

(22) Filed: Apr. 16, 2008

(65) Prior Publication Data

US 2009/0115949 A1 May 7, 2009

(30) Foreign Application Priority Data

Nov. 7, 2007 (TW) .............................. 96141980 A

(51) Int. Cl.
*G02F 1/1335* (2006.01)
*G02F 1/1343* (2006.01)

(52) U.S. Cl. ........................................ 349/114; 349/38

(58) Field of Classification Search .................. None
See application file for complete search history.

(56) References Cited

U.S. PATENT DOCUMENTS

| | | | |
|---|---|---|---|
| 2004/0150761 A1* | 8/2004 | Wong et al. ........................ | 349/43 |
| 2004/0227876 A1* | 11/2004 | Okumura ....................... | 349/114 |
| 2005/0046770 A1* | 3/2005 | Choo ............................. | 349/114 |
| 2006/0125987 A1* | 6/2006 | Chang et al. ................... | 349/114 |
| 2006/0152654 A1* | 7/2006 | Tung et al. ..................... | 349/107 |
| 2007/0002224 A1* | 1/2007 | Moon et al. .................... | 349/114 |
| 2007/0024777 A1* | 2/2007 | Sawayama et al. ............ | 349/113 |
| 2008/0030661 A1* | 2/2008 | Tung et al. ..................... | 349/114 |

FOREIGN PATENT DOCUMENTS

| | | |
|---|---|---|
| CN | 1407374 A | 4/2003 |
| CN | 1523404 A | 8/2004 |
| CN | 1800927 A | 7/2006 |
| CN | 1828910 A | 9/2006 |
| CN | 1976046 A | 6/2007 |
| CN | 101013234 A | 8/2007 |

* cited by examiner

Primary Examiner — Tina M Wong
(74) Attorney, Agent, or Firm — Ingrassia Fisher & Lorenz, P.C.

(57) ABSTRACT

A liquid crystal display panel is provided. The LCD panel includes a first substrate, a second substrate parallel to the first substrate, and a liquid crystal layer disposed therebetween. The first substrate, having a plurality of sub-pixels, includes a first base, an array of switch units, a dielectric layer, and a reflective electrode. The switch units are disposed on the first substrate wherein a first switch unit of the array of switch units is located at one of the sub-pixels. The dielectric layer, formed on the array of switch units, has at least one contact. The dielectric layer has a rough structure with concave portions and convex portions. The convex portion has a height t, and a width d, as well as the side wall of the convex portion have a slant angle θ, wherein the width d, is not less than $2*t*\cot\theta$. The reflective electrode is disposed on the dielectric layer and electrically connected to the first switch unit through the contact.

13 Claims, 5 Drawing Sheets

LCD PANEL

CROSS REFERENCE TO RELATED APPLICATION

This patent application claims the right of priority based on Taiwan Patent Application No. 096141980 entitled "LCD PANEL", filed on Nov. 7, 2007, the disclosure of which is incorporated herein by reference in its entirety.

FIELD OF THE INVENTION

The present invention relates to a liquid crystal display (LCD) panel, and more particularly, to an LCD panel with increased reflection efficiency.

BACKGROUND OF THE INVENTION

LCD technology is widely used in various consumer electronic products, for example, notebook computers, PDAs, mobile phones, etc., due to several advantages such as high portability, low power consumption, zero radioactive pollution, and so on, and has become very popular. In recent years, LCDs have even taken the place of cathode-ray tube (CRT) displays used in traditional desktop computers. LCD can be further categorized into three types according to its light source: transmissive, reflective, and transflective. Among them, a transmissive type LCD provides light by employing a backlight module, however, its power consumption is relatively larger and display performance is rather poor when the ambient light is too bright. In a reflective type LCD, on the other hand, the transparent electrode layer is replaced by a reflective electrode layer while external light acts as the light source without using a backlight module, but the brightness is uneven and LCDs of this type do not work very well when the ambient light is insufficient. As a result, a transflective type LCD becomes the target for further development.

With reference to FIG. 1, in a conventional transflective LCD 100, there exist a first substrate 102, a second substrate 106 parallel to the first substrate 102, and a liquid crystal layer 104 situated sealed between the first substrate 102 and the second substrate 106. A reflective region 101 and a transmissive region 103 exist in each of the sub-pixels in the LCD 100. For display, the LCD 100 utilizes a backlight source and the ambient light source. The backlight source provides a light beam T1 through the transmissive region 103, whereas the ambient light source provides light beams R1 and R2 respectively in the transmissive region 103 and the reflective region 101. Because the reflective light of light beam R1 is relatively weaker compared with than that of light beam R2, the effect of the reflective light of light beam R1 will can be ignored in the following discussion. The problem of poor display performance when the ambient light is too bright is solved by using the reflective electrode 105. However, as can be observed in FIG. 1, the reflection efficiency of the light beam R2 can not be effectively improved due to the nature limitations of the reflective electrode 105, and moreover, the reflection direction is not always the best viewing angle for the user.

Transflective LCDs have an advantage in that no extra processing is required to manufacture transflective components used in regular transmissive LCDs, thereby solving the issues of poor display performance when the ambient light is too bright. However, the reflection efficiency of traditional transflective panels can not be notably increased due to the above-described issues, therefore necessitating a way which is easy to practice and cost-effective, to increase the reflection efficiency of the LCDs.

SUMMARY OF THE INVENTION

The present invention provides an LCD panel, which includes a first substrate, a second substrate and a liquid crystal layer. The first substrate has multiple sub-pixels and includes a first base, an array of switch units, a dielectric layer and a reflective electrode. The array of switch units, which is disposed on the first base, includes a first switch unit located in one of the sub-pixels. The dielectric layer is disposed on the array of switch units and has at least one contact hole. The dielectric layer has a rough structure with convex portions and concave portions. The convex portion of the rough structure has a height t and a width d, and the side wall of the convex portion has a slant angle θ. The width d is not less than 2*t*cot θ. The reflective electrode is disposed on the dielectric layer and electrically connected to the first switch unit by means of via the contact hole. The second substrate is parallel to the first substrate, while the liquid crystal layer is located between the first substrate and the second substrate.

Another aspect of the present invention provides an LCD panel which includes a first substrate, a second substrate and a liquid crystal layer. The first substrate has multiple sub-pixels and includes a first base, an array of switch units, a capacitor bottom electrode, a dielectric layer and a reflective electrode. The array of switch units, which is disposed on the first base, includes a first switch unit located in one of the sub-pixels. The capacitor bottom electrode is disposed on the first base. The dielectric layer is disposed on the array of switch units and the capacitor bottom electrode and has a rough structure with concave portions and convex portions. The reflective electrode is disposed on the dielectric layer and electrically connected to the first switch unit by means of via the contact hole, and the reflective electrode and the capacitor bottom electrode together form a storage capacitor. The second substrate is parallel to the first substrate, and the liquid crystal layer is located between the first substrate and the second substrate.

Still another aspect of the present invention provides an LCD panel which includes a first substrate, a second substrate, and a liquid crystal layer. The first substrate has multiple sub-pixels and includes a first base, a semiconductor layer, an insulating layer, a gate line, a gate, a capacitor bottom electrode, a dielectric layer, a reflective electrode, a data line, and a source. The semiconductor layer is disposed on the base and has a source region, a channel region and a drain region. The insulating layer is disposed on the semiconductor layer and the gate line is disposed on the base. The gate,gate disposed on the insulating layer and corresponding to the channel region, is electrically connected to the gate line. The capacitor bottom electrode is disposed on the insulating layer. The dielectric layer, located on the gate and the capacitor bottom electrode, has a rough structure with concave portions and convex portions. The reflective electrode is disposed on the dielectric layer and electrically connected to the drain region, and the reflective electrode and the capacitor bottom electrode together form a storage capacitor. The data line is disposed on the base. The source, disposed on the dielectric layer and corresponding to the source, is electrically connected to the data line. The second substrate is parallel to the first substrate, and the liquid crystal layer is located between the first substrate and second substrate.

BRIEF DESCRIPTION OF THE DRAWINGS

The appended drawings illustrate only exemplary embodiments of the invention and therefore do not limit the scope of the invention.

DETAILED DESCRIPTION

Figure 1:
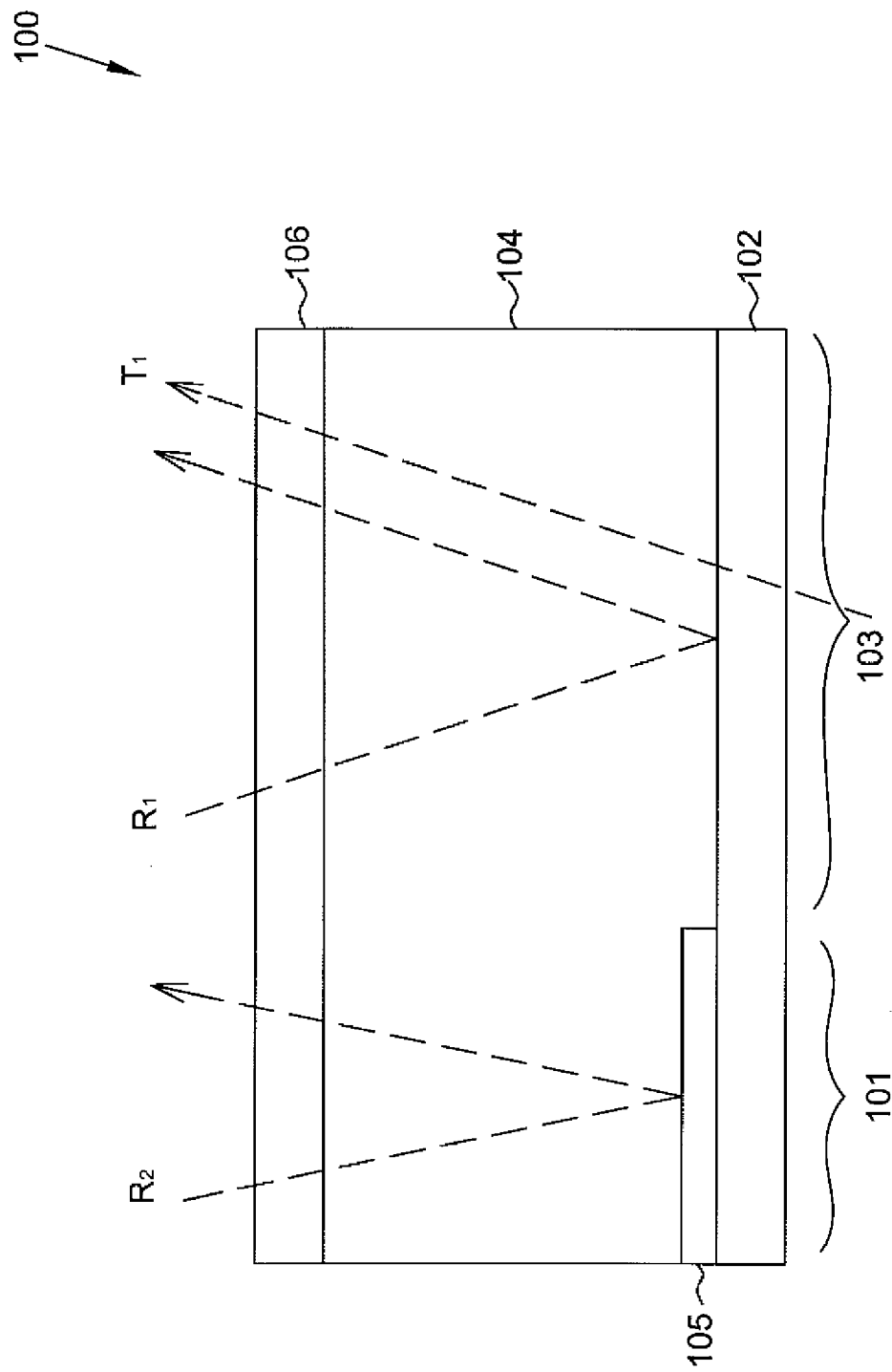
FIG. 1 shows a cross-sectional view of a conventional transflective LCD panel.

The invention is described more fully hereinafter with reference to the accompanying drawings, in which exemplary embodiments of the invention are shown. This invention may, however, be embodied in many different forms and should not be construed as limited to the exemplary embodiments set forth herein. In the drawings, the size and relative sizes of layers and regions may be exaggerated for better understanding of the present invention. Like reference numerals in the drawings denote like elements.

Figure 2A:
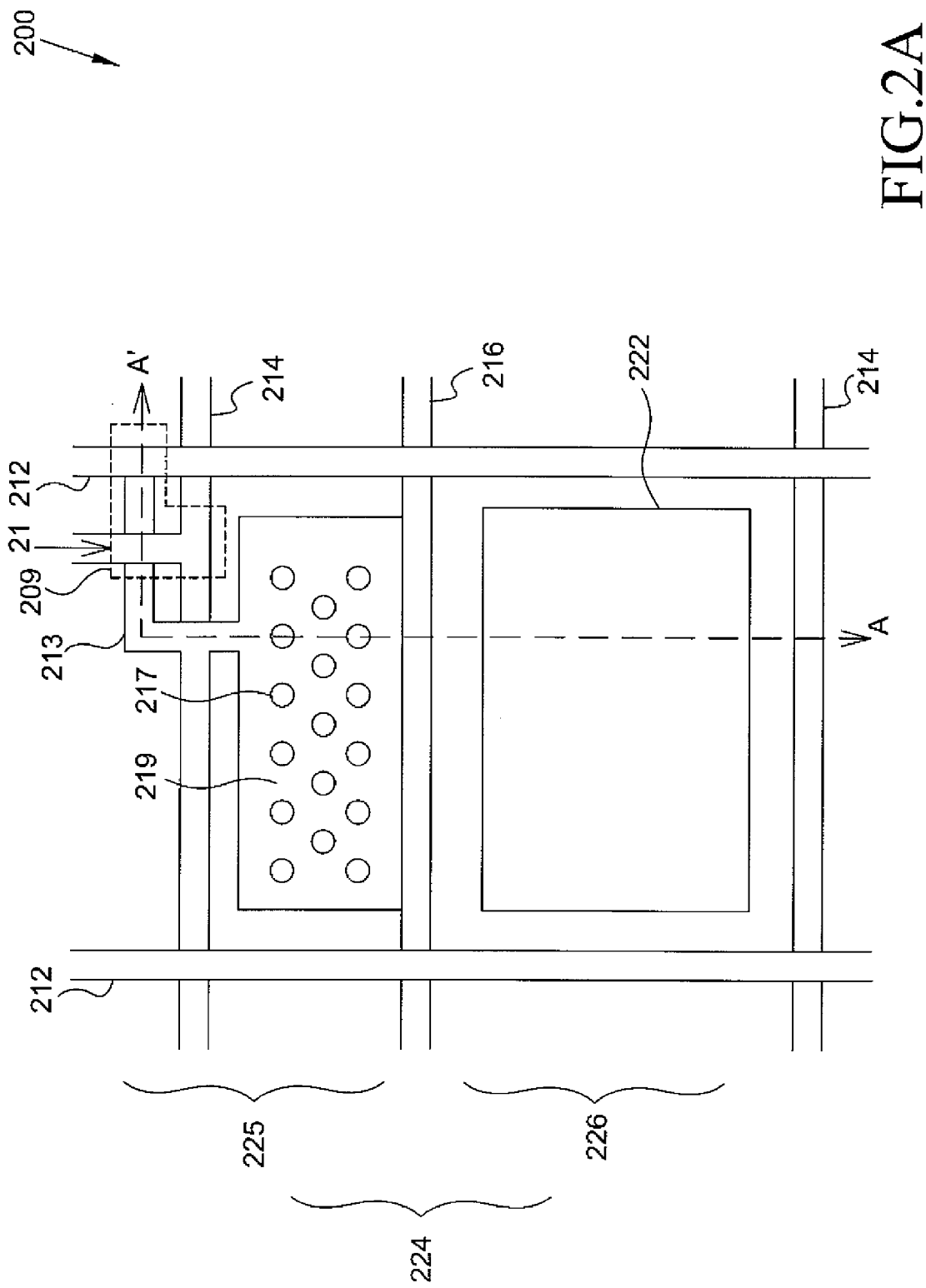
FIG. 2A shows a top view of a LCD panel according to an embodiment of the present invention.
Figure 2B:
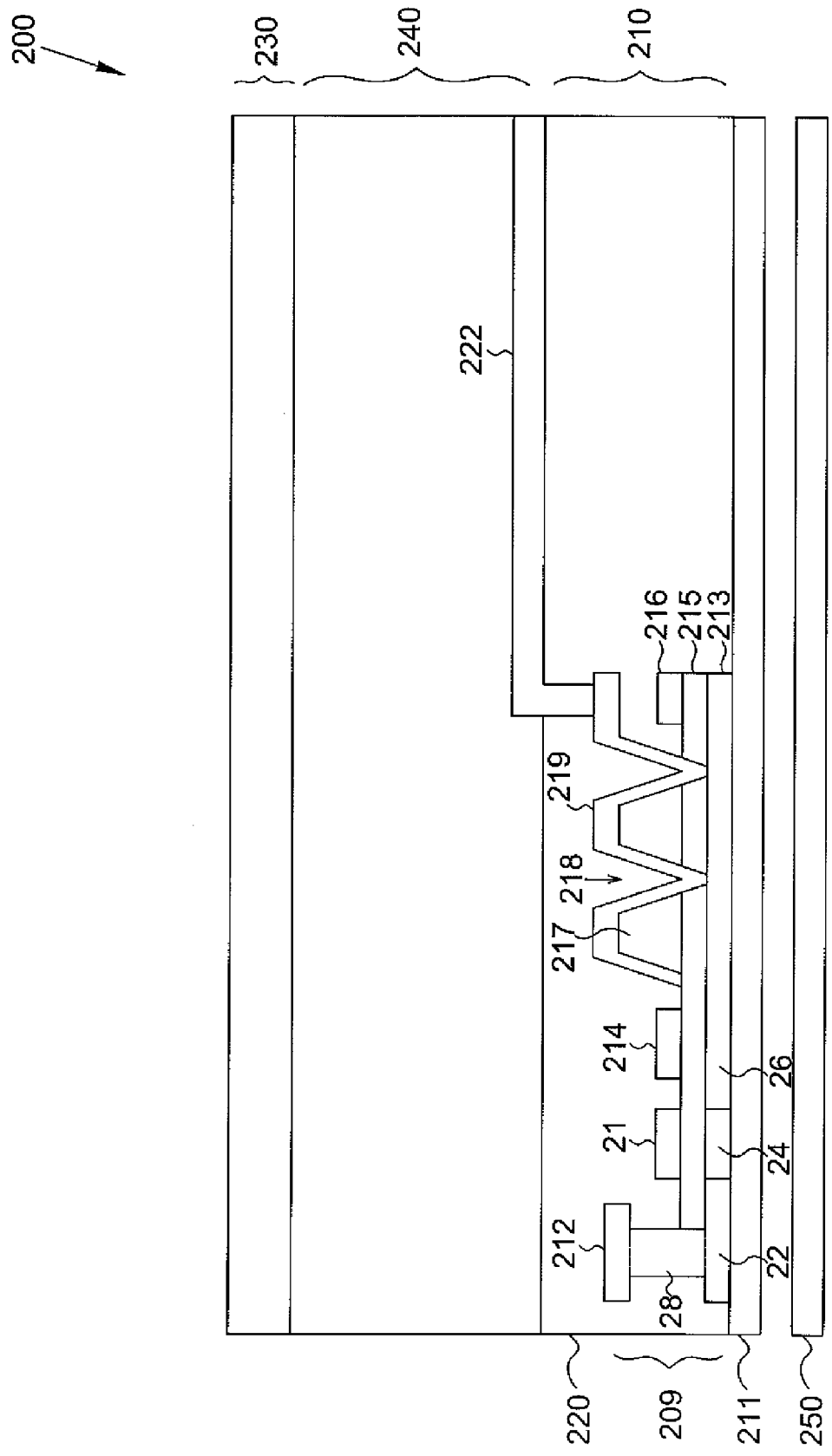
FIG. 2B shows a cross-sectional view of the LCD panel in FIG. 2A.

FIG. 2A shows a top view of an LCD panel 200 according to an embodiment of the present invention, while FIG. 2B shows a cross-sectional view of the LCD panel 200 of FIG. 2BA along the line AA'. The LCD panel 200 includes a first substrate 210, a second substrate 230, a liquid crystal layer 240 and a backlight module 250. The first substrate 210 has multiple sub-pixels 2424, which have a reflective region 225 and a transmissive region 226. The second substrate 230 is parallel to the first substrate 210, and the liquid crystal layer 240 is located between the first substrate 210 and the second substrate 230. In this embodiment, the second substrate 230 is a color filter substrate, for example. The backlight module 250 is located below the first substrate 210 for providing a backlight source.

The first substrate 210 includes a first base 211, an array of switch units 208, an insulating layer 215, a semiconductor layer 213, a reflective electrode 219, a planarization layer 220 and a transmissive electrode 222. Disposed on the first base 211 are an array of switch units 208, data lines 212, gate lines 214 and a capacitor bottom electrode 216. The array of switch units 208 includes a first switch unit 209 located in the sub-pixel 224. The semiconductor layer 213 (e.g., polysilicon) is located on the first base 211 and has a source region 22, a channel region 24 and a drain region 26. The dielectric layer 217 is located on the array of switch units 208 and has at least one contact hole 218. The dielectric layer 217 has a rough structure with concave portions and convex portions, and the reflective electrode 219 is disposed on the dielectric layer 217 and electrically connected to the first switch unit 209 by means of the contact hole 218. The gate 21 is disposed on the insulating layer 215 and corresponds to the channel region 24. The reflective electrode 219 and the drain region 26 are electrically connected to each other via by means of the contact hole 218, and the reflective electrode 219 and the capacitor bottom electrode 216 together form a storage capacitor. The source 28 is disposed corresponding to the source region 22 and electrically connected to the data line 212. The planarization layer 220 is located on the reflective electrode 219. The transmissive electrode 222, located on the planarization layer 220 and in the transmissive region 226, is electrically connected to the reflective electrode 219. By virtue of the rough structure design of the dielectric layer 217, a better reflection angle or reflection rate is obtained when the incident ambient light reaches the rough structure of the dielectric layer 217, thereby increasing the reflection efficiency.

Figure 3:
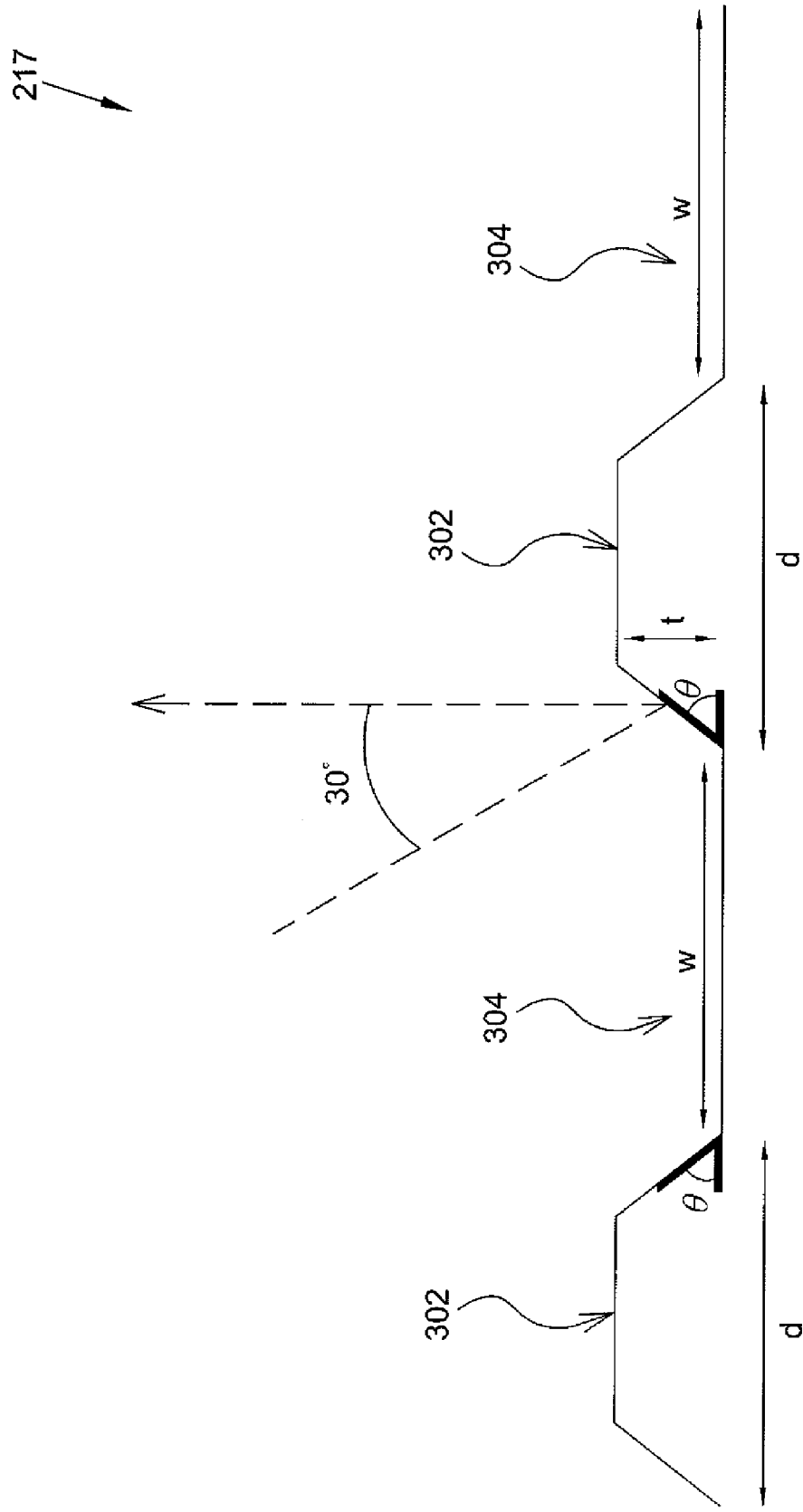
FIG. 3 shows a cross-sectional view of a rough structure according to an embodiment of the present invention.

FIG. 3 further shows a cross-sectional view of the rough structure of the dielectric layer 217. For example, if the angle of incidence is 30 degrees in normal situations, the majority of the incident light can be reflected in a direction perpendicular to the LCD panel 200, thus increasing the reflection efficiency. In the current embodiment, the convex portion 302 of the rough structure has a height t and a width d, and the concave portion 304 of the rough structure has a width w. The side wall of the convex portion 302 has a slant angle θ, and the width d is preferably not less than 2*t*cot θ. The preferred range of the slant angle θ is from about 1 degree to about 30 degrees, and the range of width w is from about 1 micrometer to about 10 micrometers. By virtue of the design of the rough structure, the angle of reflection will be directed such that it is a preferred viewing angle for the user when the incident ambient light reaches the reflective electrode 219.

Figure 4A:
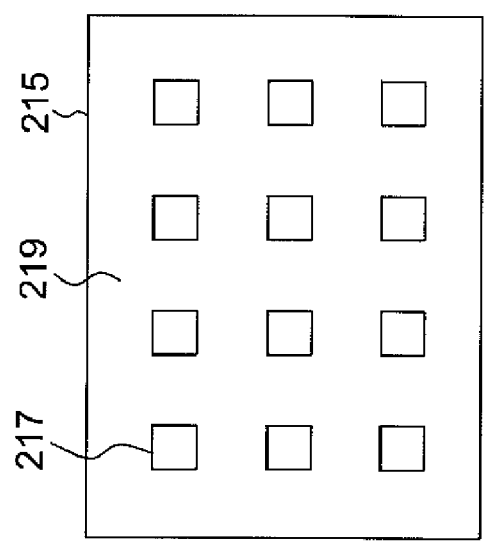
FIG. 4A and FIG. 4B show top views of a LCD panel according to other embodiments of the present invention.
Figure 4B:
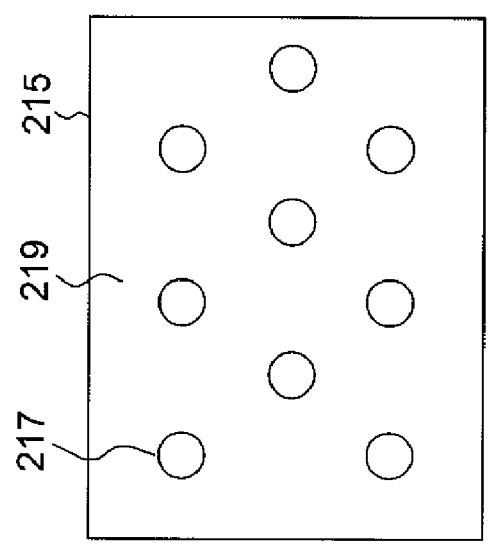

FIG. 4A and FIG. 4B show top views of the rough structure 217 of the LCD panel 200 according to other embodiments of the present invention. The shape of the rough structure 217 is not specifically limited, but can be of various forms of choice without hampering the practice of the present invention. In the embodiment as shown in FIG. 4A, the convex portions of the rough structure 217 are square in shape and uniformly distributed; in the embodiment as shown in FIG. 4B, the convex portions of rough structure 217 are circular and randomly distributed.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An LCD panel, comprising:
    a first substrate having a plurality of sub-pixels, said first substrate comprising:
    a first base with a semiconductor layer thereon;
    an array of switch units disposed on said first base, wherein said array of switch units comprises a first switch unit located in one of said sub-pixels, and wherein said first switch unit has;
    a source region and a drain region in said semiconductor layer;
    an insulating layer disposed on said semiconductor layer; and
    a gate overlying said insulating layer;
    a capacitor bottom electrode disposed on said insulating layer of said first switch unit;
    a dielectric layer, disposed on said insulating layer of said first switch unit and said capacitor bottom electrode, said dielectric layer contacting said capacitor bottom electrode, said dielectric layer having a rough structure with concave portions and convex portions apart from each other, wherein a contact hole is through said insulating layer and said dielectric layer; and
    a reflective electrode disposed on said dielectric layer and electrically connected to said first switch unit via said contact hole, said reflective electrode and said capacitor bottom electrode together forming a storage capacitor;
    a second substrate parallel to said first substrate; and
    a liquid crystal layer located between said first substrate and said second substrate.

2. The LCD panel of claim 1, wherein said sub-pixel has a reflective region and a transmissive region, said reflective electrode being disposed in said reflective region, said first substrate further comprising:

a planarization layer disposed on said reflective electrode; and a transmissive electrode disposed on said planarization layer and in said transmissive region, said transmissive electrode being electrically connected to said reflective electrode.

3. The LCD panel of claim 1, wherein said convex portion of said rough structure has a height t and a width d, the side wall of said convex portion having a slant angle θ, wherein said width d is not less than 2*t*cotθ.

4. The LCD panel of claim 3, wherein the range of said slant angle θ is from about 1 degree to about 30 degrees.

5. The LCD panel of claim 3, wherein said concave portion of said rough structure has a width w, the range of said width w being from about 1 micrometer to about 10 micrometers.

6. The LCD panel of claim 1, wherein said concave portions and said convex portions are randomly distributed in said rough structure.

7. The LCD panel of claim 1, wherein said concave portions and said convex portions are uniformly distributed in said rough structure.

8. An LCD panel, comprising:
a first substrate having a plurality of sub-pixels, said first substrate comprising:
a first base;
a semiconductor layer disposed on said base, said semiconductor layer having a source region, a channel region and a drain region;
an insulating layer disposed on said semiconductor layer;
a gate line disposed on said insulating layer;
a gate disposed on said insulating layer and corresponding to said channel region, said gate and said gate line being electrically connected;
a capacitor bottom electrode disposed on said insulating layer;
a dielectric layer located on said insulating layer and said capacitor bottom electrode, said dielectric layer contacting said capacitor bottom electrode, said dielectric layer having a rough structure with concave portions and convex portions apart from each other, wherein a contact hole is through said insulating layer and said dielectric layer;

a reflective electrode disposed on said dielectric layer and electrically connected to said drain region via said contact hole, wherein said reflective electrode and said capacitor bottom electrode together form a storage capacitor;

a source disposed on said dielectric layer and corresponding to said source region; and a data line disposed on and electrically connected to said source;

a second substrate parallel to said first substrate; and a liquid crystal layer disposed between said first substrate and said second substrate.

9. The LCD panel of claim 8, wherein the material of said semiconductor comprises polysilicon.

10. The LCD panel of claim 8, wherein said sub-pixel has a reflective region and a transmissive region, said reflective electrode being located in said reflective region, said first substrate further comprising:
a planarization layer located on said reflective electrode; and
a transmissive electrode located on said planarization layer and in said transmissive region, said transmissive electrode being electrically connected to said reflective electrode.

11. The LCD panel of claim 8, wherein said convex portion of said rough structure has a height t and a width d, the side wall of said convex portion having a slant angle θ, wherein said width d is not less than 2*t*cotθ.

12. The LCD panel of claim 11, wherein the range of said slant angle is from about 1 degree to about 30 degrees.

13. The LCD panel of claim 8, wherein the concave portion of said rough structure has a width w, the range of said width w being from about 1 micrometer to about 10 micrometers.

* * * * *